US008832751B2

(12) United States Patent
Noh et al.

(10) Patent No.: US 8,832,751 B2
(45) Date of Patent: Sep. 9, 2014

(54) ENHANCED VIDEO STREAMING TO MOBILE CLIENTS

(75) Inventors: Jeonghun Noh, Palo Alto, CA (US); Bernd Girod, Stanford, CA (US); Jatinder Pal Singh, Mountain View, CA (US); Kyu-Han Kim, Redwood City, CA (US); Sachin Kumar Agarwal, Berlin (DE); Peter Pogrzeba, Berlin (DE)

(73) Assignees: Deutsche Telekom AG, Bonn (DE); The Board of Trustees of the Leland Stanford Junior University, Stanford, CA (US)

( * ) Notice: Subject to any disclaimer, the term of this patent is extended or adjusted under 35 U.S.C. 154(b) by 309 days.

(21) Appl. No.: 12/871,137

(22) Filed: Aug. 30, 2010

(65) Prior Publication Data

US 2012/0054818 A1 Mar. 1, 2012

(51) Int. Cl.
| | |
|---|---|
| *H04N 7/18* | (2006.01) |
| *H04N 21/647* | (2011.01) |
| *H04N 21/61* | (2011.01) |
| *H04N 21/222* | (2011.01) |
| *H04N 21/258* | (2011.01) |
| *H04N 21/63* | (2011.01) |
| *H04N 21/414* | (2011.01) |
| *H04N 21/2343* | (2011.01) |

(52) U.S. Cl.
CPC ... *H04N 21/41407* (2013.01); *H04N 21/64707* (2013.01); *H04N 21/6175* (2013.01); *H04N 21/222* (2013.01); *H04N 21/6125* (2013.01); *H04N 21/25825* (2013.01); *H04N 21/6131* (2013.01); *H04N 21/631* (2013.01); *H04N 21/6181* (2013.01); *H04N 21/64792* (2013.01); *H04N 21/64738* (2013.01); *H04N 21/234363* (2013.01); *H04N 21/632* (2013.01)
USPC ................................. 725/81; 725/80; 725/82

(58) Field of Classification Search
CPC .......... H04N 21/6125; H04N 21/6131; H04N 21/6175; H04N 21/6181; H04N 21/631; H04N 21/632; H04N 21/64707; H04N 21/64738; H04N 21/64792
USPC ............... 725/74, 81, 82, 85, 86, 91, 93, 100, 725/143–147, 151, 153
See application file for complete search history.

(56) References Cited

U.S. PATENT DOCUMENTS

| | | | | |
|---|---|---|---|---|
| 5,831,975 | A | * | 11/1998 | Chen et al. ................... 370/256 |
| 2001/0022000 | A1 | * | 9/2001 | Horn et al. ...................... 725/95 |

OTHER PUBLICATIONS

Dogan et al., Error-Resilient Video Transcoding for Robust Internetwork Communications Using GPRS, IEEE Transactions on Circuits and systems for video technology, vol. 12, No. 6, pp. 453-464, 2002.

(Continued)

*Primary Examiner* — Dominic D Saltarelli
(74) *Attorney, Agent, or Firm* — Leydig, Voit & Mayer, Ltd.

(57) ABSTRACT

A system for enabling streaming video to a mobile client includes a plurality of fixed node peers linked to the mobile client via one or more networks as well as a video source linked to fixed node peers and configured to provide streaming video data representing a video presentation to each of the fixed node peers. A decoder assembly associated with each of the fixed node peers is configured to decode the streaming video data and to transcode a portion of the decoded streaming video data for transmission to the mobile client. A video substream manager and interleaver on the mobile client is provided for receiving the transcoded output of the decoder assemblies of the fixed node peers and reconstructing the video presentation on a screen of the mobile client.

13 Claims, 8 Drawing Sheets

(56) References Cited

OTHER PUBLICATIONS

Dutta et al., Multicasting Streaming Media to Mobile Users, IEEE Communications Magazine, vol. 41, No. 10, pp. 81-89, 2003.

Leung et al., Broadcast-Based Peer-to-Peer Collaborative Video Streaming Among Mobiles, IEEE Transactions on Broadcasting, vol. 53, pp. 350-361, 2007.

Venot et al., On-Demand Mobile Peer-to-Peer Streaming over the JXTA Overlay, Mobile Ubiquitous Computing, Systems, Services and Technologies, (UBICOMM), pp. 131-136, Nov. 2007.

Vetro et al., Video Transcoding Architectures and Techniques: An Overview, IEEE Signal Processing Magazine, vol. 20, No. 2, pp. 18-29, 2003.

Warabino et al., Video Transcoding Proxy for 3G Wireless Mobile Internet Access, Communications Magazine, pp. 66-71, Jan. 2000.

* cited by examiner

ENHANCED VIDEO STREAMING TO MOBILE CLIENTS

FIELD

The present invention relates to the streaming of data to mobile devices, and more particularly to a system and method for the distributed processing of data to be streamed in a peer-to-peer network.

BACKGROUND

Live streaming of data such as audio and video data to a mobile device, such as a cellular phone or Personal Digital Assistant (PDA), can be a challenging task due to many factors including, for example, the heterogeneity of the devices. In particular, mobile devices vary widely in terms of display size, main memory capacity, processor type and power, media capability, and network access technology. In typical streaming systems, real-time media adaptation is performed to meet the requirements of heterogeneous mobile devices. With respect to video, such media adaptation is often achieved by video transcoding, which converts an original video bit stream to a new bit stream for a different encoding standard, smaller spatial resolution, reduced frame rate, or reduced quality (due to coarser quantization).

However, transcoding poses a considerable computational burden on the streaming server, because mobile devices often require individually customized transcoding. In other words, the transcoding that is performed to service the video request of a particular device will often not be appropriate for another device requesting the same material at the same time. Thus, the computational burden of transcoding is multiplied by the number of potentially required formats, making the streaming of video to mobile devices a computationally intensive endeavor. Moreover, peers, as commodity computers, are not as reliable as servers, making the shifting of the transcoding task from a server to an ordinary peer of a P2P system very challenging.

SUMMARY

In an embodiment, the present disclosure provides a system for enabling streaming video to a mobile client, the system comprising a plurality of fixed node peers linked to the mobile client via one or more networks as well as a video source linked to fixed node peers and configured to provide streaming video data representing a video presentation to each of the fixed node peers. A decoder assembly associated with each of the fixed node peers is configured to decode the streaming video data and to transcode a portion of the decoded streaming video data for transmission to the mobile client. A video substream manager and interleaver on the mobile client is provided for receiving the transcoded output of the decoder assemblies of the fixed node peers and reconstructing the video presentation on a screen of the mobile client.

DETAILED DESCRIPTION

Figure 1:
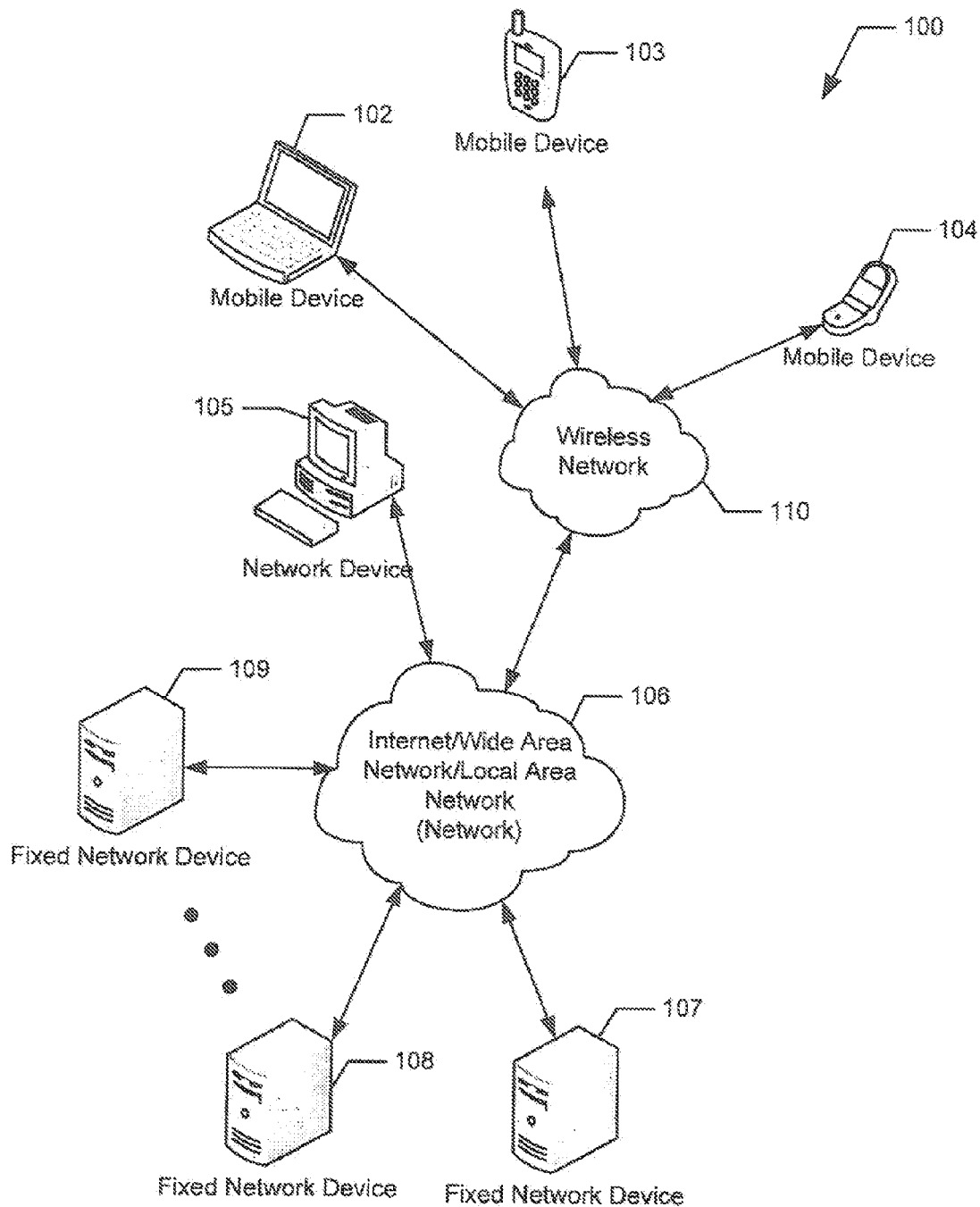
FIG. 1 depicts a network system according to one embodiment of the invention for distributing encoded video data.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

For mobile streaming, transcoding is necessary not only to reduce the video bit rate, but also to change the video encoding format. For example, mobile phones currently support the H.264/AVC baseline profile, which does not support B-frames. Moreover, each mobile phone usually has its own transcoding requirements in terms of video encoding scheme, frame rates, spatial resolution, and bit rate. This poses a large video processing burden on video servers and CDNs.

Furthermore, there is a limit on the number of concurrent multicast sessions allowed at Internet routers. In the case of IP-TV for example, scalability is not an issue because the number of IP-TV channels is usually a few hundred, and is under the control of the content provider (and ISP). However, the number of user-generated streams can be quite large.

In addressing these issues, the P2P streaming system described herein has potential beyond live streaming, such as in time-shifted streaming. The P2P architecture described herein with respect to embodiments of the invention allow a mobile client to elect more than one fixed node peer to have video transcoded, so that graceful video degradation (that is, robust video streaming) can be achieved in the presence of fixed node peer failure or packet losses in a certain video substream. Time-shifted streaming is achieved by storing the past portion of the live stream in the P2P system, usually at each peer. In contrast, IP multicast only supports live streaming because storing contents at Internet routers is prohibitively costly.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 include network 106, wireless network 110, mobile devices 102-104, fixed network devices 105 and 107-109.

In general, system 100 has a Peer-to-Peer (P2P) distributed network structure including network nodes (devices) that make a portion of their resources, such as processing power, network bandwidth, or data stored thereon, directly available to other network nodes, without the need for central coordination instances, such as servers or stable hosts. A network node, such as mobile devices 102-104 or fixed network devices 105 or 107-109, can directly request and receive data from a plurality of other participants and assemble them to recover the information. For example, mobile device 102 can request video data be sent from fixed network devices 107-109 in parallel and assemble them to form a single video stream, which is then played back on the screen of the mobile device 102. Because the system 100 is organized in a P2P structure, there is no server-client relationship among the devices 102-105 and 107-109. Each device can potentially contribute to data available within the system 100.

Generally, mobile devices 102-104 may include virtually any mobile computing device capable of receiving data over a network, such as wireless network 110, or the like. Such devices include portable devices such as, cellular telephones, smart phones, radio frequency (RF) devices, infrared devices, Personal Digital Assistants (PDAs), handheld computers, laptop computers, wearable computers, tablet computers, integrated devices combining one or more of the preceding devices, or the like. It will be appreciated that a given device may be mobile or fixed depending upon connectivity. For example, a laptop, if it is connected to the Internet via WiFi or a wire, such as the Ethernet or fiber cable, and plugged into a wall outlet and has a CPU capable of transcoding while playing out video, can also be considered a fixed node.

More generally, a fixed node peer, in contrast to a mobile client, is a computing device that has a sufficient downlink bit rate to receive the original video at a full bit rate, a sufficient computing power to transcode the video (such that a transcoding burden does not impact the video viewing experience of the device's user), and a sufficient electrical power source (transcoding is usually computationally intensive and drains much power). Network device 105 may include virtually any computing device that typically connects using a wired communications medium such as personal computers, multiprocessor systems, microprocessor-based or programmable consumer electronics, network PCs, or the like.

By way of example, devices that may operate as network devices 107-109 include personal computers desktop computers, multiprocessor systems, microprocessor-based or programmable consumer electronics, network PCs, servers, and the like.

In general, the fixed network devices 107-109 have higher processing power and larger disk storage and bandwidth, and, therefore, are configured to receive as well as supply resources or data to other participants in system 100. Some of the fixed network devices, on the other hand, such as device 105, have very limited processing power or storage space. Therefore, devices such as 105 are configured as consumers of data, meaning that they only receive data provided by other participants, but do not provide data to other network nodes. Similarly, most mobile devices 102-104 are generally configured as data consumer, which only receive but do not supply data, because of their limited processing power, bandwidth, and storage space.

Server device 107 may further provide a variety of services that include, but are not limited to web services, third-party services, audio services, video services, email services, IM services, SMS services, VOIP services, calendaring services, photo services, or the like. Content may include web content, audio content, video content, FTP data, or the like.

Wireless network 110 is configured to couple mobile devices 102-104 with network 105. Wireless network 110 may include any of a variety of wireless sub-networks that may further overlay stand-alone ad-hoc networks, or the like, to provide a connection for mobile devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between mobile devices 102-104 and another computing device, network, or the like.

Network 105 is configured to couple network devices 105 and 107-109 with other computing devices, including through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

In essence, network includes any communication method by which information may travel between computing devices. Illustrative Mobile Devices 102-104 and Network Device 105

Figure 2:
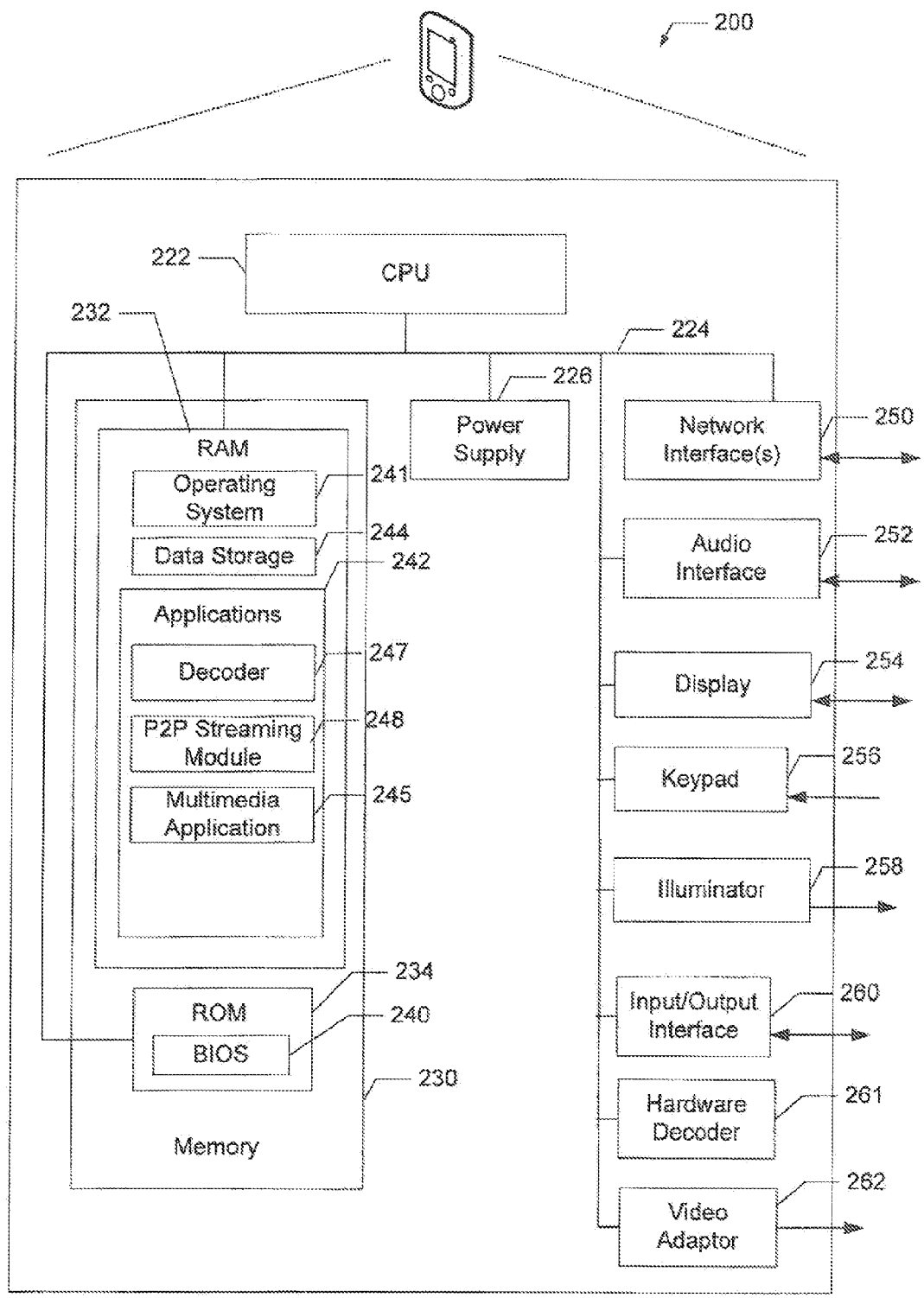
FIG. 2 depicts a schematic diagram of the mobile device shown in FIG. 1.

FIG. 2 shows one embodiment of device 200 that may be included in system 100 implementing the invention. Device 200 may include many more or less components than those shown in FIG. 2. However, the components shown are sufficient to implement an illustrative embodiment for practicing the present invention. Device 200 may represent, for example, one embodiment of at least one of mobile devices 102-104 and network device 105 of FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, and an input/output interface 260. Power supply 226 provides power to device 200. A rechargeable or non-rechargeable battery may be used to provide power. The power may also be provided by an external power source, such as an AC adapter or a powered docking cradle that supplements and/or recharges a battery.

Device 200 can communicate with another computing device directly or indirectly via network interface 250. Network interface 250 includes circuitry for coupling device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand. In addition, device 200 may further include video adaptor 262, which is configured to provide video signals to an external display.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the device is powered. In addition, illuminator 258 may backlight these buttons in various patterns when particular actions are performed, such as dialing another device. Illuminator 258 may also cause light sources positioned within a transparent or translucent case of the device to illuminate in response to actions.

Device 200 also comprises input/output interface 260 for communicating with external devices, such as a headset. Input/output interface 260 can utilize one or more communication technologies, such as USB, infrared, Bluetooth™, or the like.

Device 200 typically ranges widely in terms of capabilities and features. For example, a cell phone 104 may have a numeric keypad and a few lines of monochrome LCD display on which only text may be displayed. In another example, a web-enabled mobile device such as a PDA 103 may have a touch sensitive screen, a stylus, and several lines of color LCD display in which both text and graphics may be displayed. In still another example, a multimedia-enabled mobile device such as laptop 102 may include a multimedia application 245 such as a video player application, which is configured to render images, videos streams, audio signals, or the like through a multimedia interface such as a color LCD or LED screen or a microphone. In still another example, device 200 may also include a browser application configured to receive and display graphics, text, multimedia, or the like, employing virtually any web-based language, including a wireless application protocol messages (WAP), or the like. For example, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

As depicted in FIG. 2, in general, device 200 also includes a decoder. In one embodiment, the decoder is part of the multimedia application 245 described above or a standalone application 247 running in parallel with the multimedia application on the device. In another embodiment, the decoder is provided in a hardware module 261 as part of the hardware circuit in the device. The decoder is configured to decode multimedia data from the data stream received by the device and feed the decoded data to the multimedia application 245 such as the video player. Depending on the coding technique used in the encoded data stream, the decoder can perform loss or lossless decoding. The decoder may utilize proprietary decoding techniques or standardized decoding techniques defined in standard specifications such as H.261, H.264, JPEG, or MPEG.

Device 200 further include a P2P streaming module, which is configured to process the coded data stream received from other computing devices through network interface 250 in accordance with a P2P transmission scheme. The P2P streaming module can be part of the decoder 247 or 261 as described above or can be a standalone application 245, which operates in conjunction with the decoder. In one embodiment, the P2P streaming module operates on top of the Internet Protocol (IP) or other networking protocol as well known in the art. The P2P streaming module is further configured to provide information that identifies device 200, including a type, capability, name, or the like. In one embodiment, device 200 may uniquely identify themselves through any of a variety of mechanisms, including a phone number, Mobile Identification Number (MIN), an electronic serial number (ESN), mobile device identifier, network address, or other identifier.

In a further embodiment, the P2P streaming module 248 is configured to perform peer indexing and discovery. In particular, the P2P streaming module 248 may broadcast through network interface 250 a message, such as the "Hello" message, to each network devices in system 100. The message also identifies certain data, such as a digital video file, that device 200 requests from other devices in the system. Upon receiving responses, the P2P streaming module 248 identifies a number of network devices that has the requested data and assigns an identification (ID) to each of these network devices. In addition, the P2P streaming module 248 also conducts negotiations with other network devices to determine transmission rates, bandwidth, packet size, etc. For example, the P2P streaming module 248 may exam the responses received from the network devices that have the requested data, and select a predetermined number of network devices according to the uplink data rate or bandwidth offered by these network devices.

In addition, P2P streaming module 248 can further provide data assembling, retransmission request, and error correction. For example, P2P streaming module 248 can generate a copy of the requested data by assembling the data streams received from a plurality of computing devices in system 100. Upon discovering that one or more portions of the data are missing or contain errors, P2P streaming module 248 can request retransmissions of the unavailable data and/or correct the errors by applying an error correction method to the received data.

Illustrative Network Devices 107-109

Figure 3:
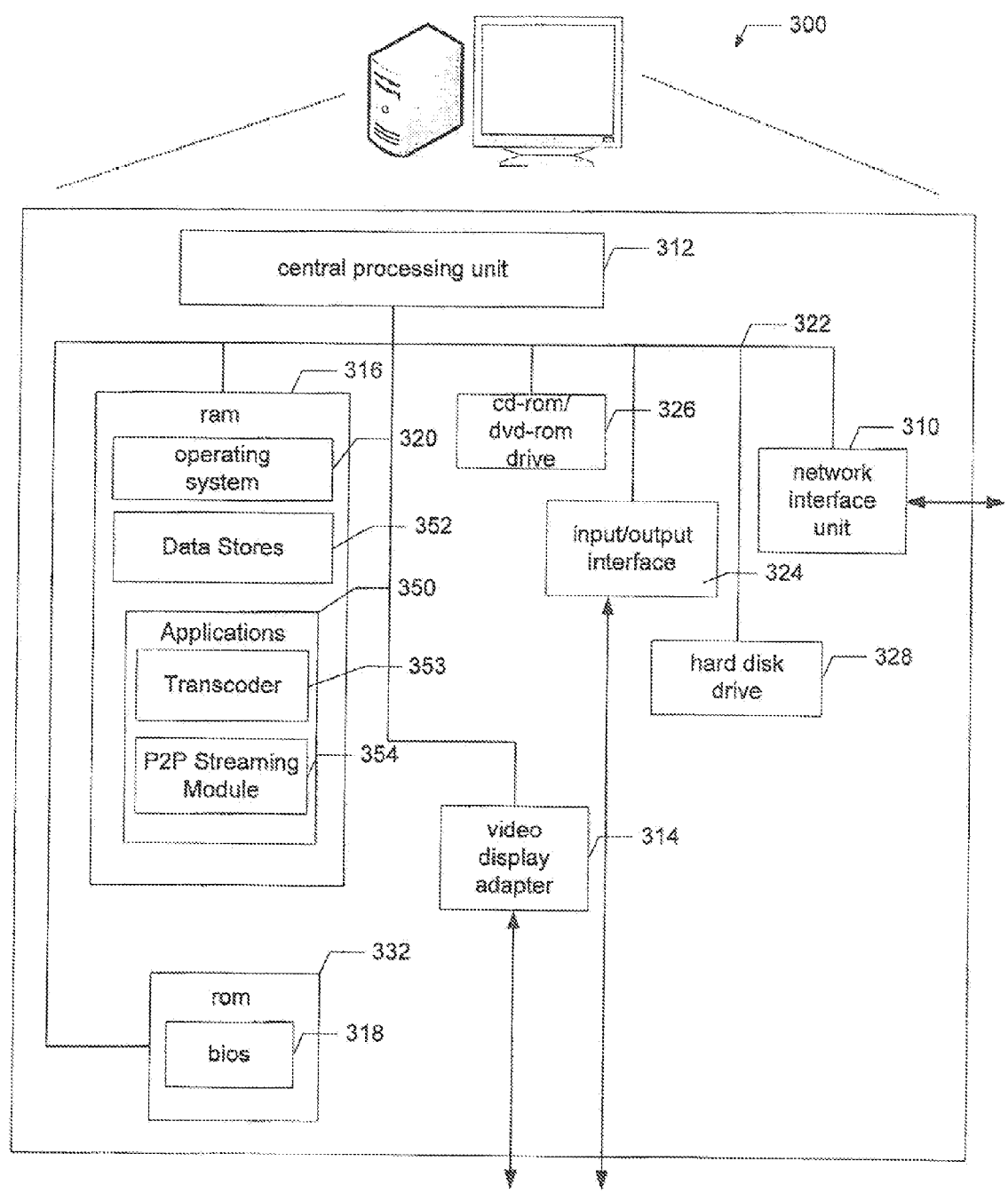
FIG. 3 depicts a schematic diagram of the fixed network device shown in FIG. 1.

FIG. 3 shows one embodiment of network devices 300. Network device 300 may include many more or less components than those shown. The components shown, however, are sufficient to disclose an illustrative embodiment for practicing the invention. Network device 300 may represent, for example, network device 107-109 of FIG. 1 and/or network device 105 of FIG. 1. As will be discussed elsewhere herein, embodiments of the invention employ SPPM. Within SPPM, a peer that does not contribute to the system, such as perhaps network device 105, is still considered a peer.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. As used herein, such computer-readable storage media refers to physical, tangible devices. Computer-readable storage media may include volatile, nonvolatile, removable, and non-removable media implemented in any method or technology for storage of information, such as computer readable instructions, data structures, program modules, or other data. Examples of computer-readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical devices which can be used to store the desired information and which can be accessed by a computing device.

RAM 316 may include one or more data stores, which can be utilized by network device 300 to store, among other things, applications 350 and/or other data. RAM 316 can also be used to store database information. The mass memory also stores program code and data. One or more applications 350 are loaded into mass memory and run on operating system 320 by central processing unit 312. Examples of application programs may include transcoder 353, P2P streaming module 354, schedulers, calendars, database programs, word processing programs, HTTP programs, customizable user interface programs, IPSec applications, encryption programs, security programs, SMS message servers, IM message servers, email servers, account managers, and so forth.

Similar to P2P streaming module 248, P2P streaming module 354 provides various functions required by the P2P transmission of data, including identification of device 300 and other computing devices within system 100, index and discovery, data assembling, error correction, etc.

The P2P system used in embodiments of the invention provides robust video transcoding/streaming by applying a distributed video transcoding algorithm to the peer-to-peer streaming system. A communication protocol provided between mobile clients and the peer-to-peer networks facilitates the parallel transcoding and transmission of streaming video to mobile clients. The described system consists of fixed nodes and mobile nodes; fixed nodes are peers that receive and consume the original video emanating from the video source. Mobile nodes are peers that cannot receive the original video due to limited downlink bandwidth, or/and cannot consume the original video due to limited video decoding capabilities.

The invention provides a refined peer-to-peer (P2P) approach to supporting streaming to mobile devices. Mobile devices include without limitation mobile phones, personal device assistants (PDAs), and mobile computers with a limited network speed. P2P streaming is a potentially cost-effective alternative to server-based streaming. In a typical P2P system, users not only consume media content, but also contribute their uplink bandwidth and/or local storage for use by others. Thus the system can scale well as users bring more resources into the system. In the system according to various embodiments of the invention, the peer network is not strictly speaking made up of peers to the mobile device, herein referred to as a mobile node, but of a network of fixed node peers, e.g., personal computers, connected to the network over a wired connection.

By diverting transcoding tasks so that they are executed using the processing power of the fixed nodes, the transcoding burden of the servers can be reduced or eliminated. In an embodiment of the invention, mobile nodes are treated as "leeches," i.e., peers that receive packets but do not relay the packets to other peers due to their limited resources (battery, uplink speed, etc.).

In an embodiment of the invention, a distributed transcoding scheme reduces the possibility of temporary video disruption and/or disconnection due to peer churn, i.e., the unexpected departure of a peer and the consequent loss of bandwidth. After a mobile device connects to multiple fixed nodes as its parents, each parent generates a substream based on transcoding of the original video. These substreams are transmitted and then assembled at the mobile device as if they were a single stream. If the mobile device loses one or more of its parents, it still receives substreams from the other parents and decodes the incoming video partially. This allows for graceful degradation, e.g., a decrease in frame rate, as opposed to a sudden disruption and/or disconnection.

Thus, in an embodiment of the invention, it is desirable to first perform video transcoding to adapt the original video data to the mobile nodes. For this reason, the fixed nodes perform transcoding to adapt the original video data according to the particular requirements of each mobile node. We employ Stanford Peer-to-Peer Multicast (SPPM) among the fixed nodes as the P2P streaming mechanism.

Figure 4:
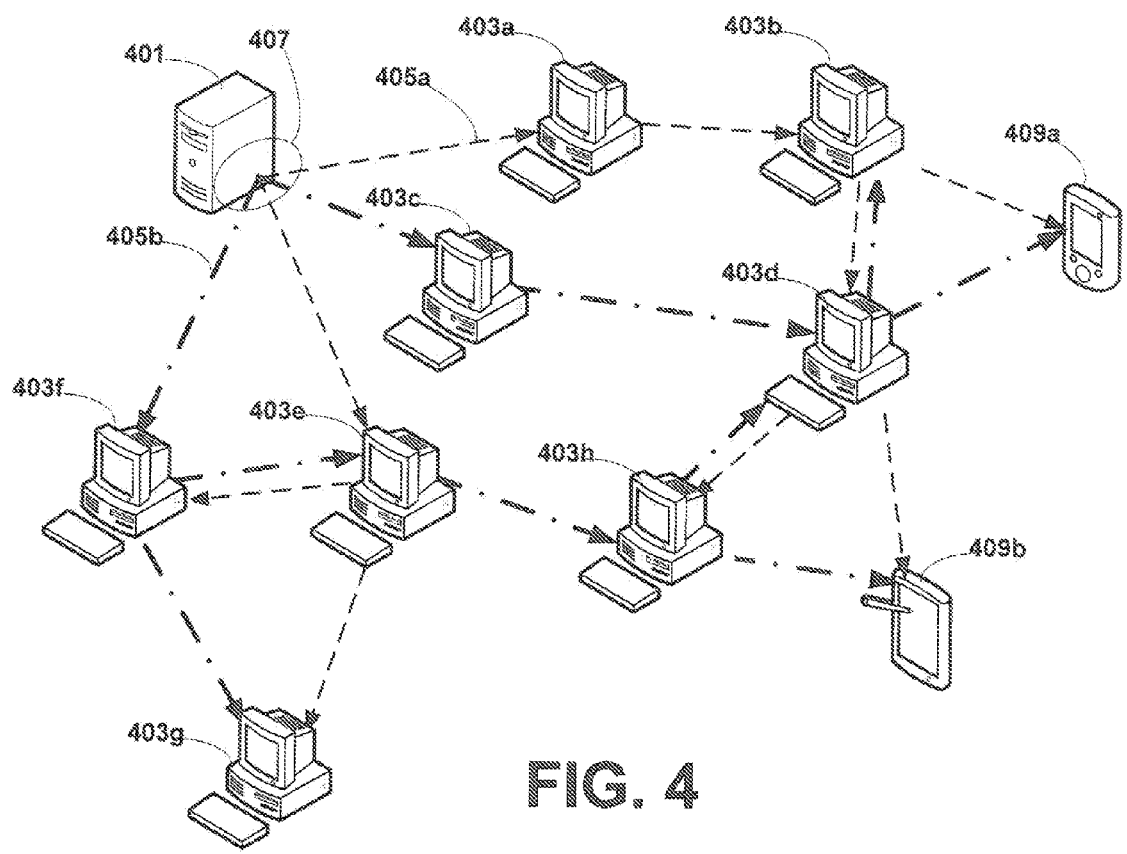
FIG. 4 is a schematic network diagram showing a multi-tree peer-to-peer network associated with a mobile device for parallel transposing of streaming media.

In essence, SPPM provides a live video multicast service to a population of fixed peers. In an embodiment of the invention, the SPPM system is modified to support video streaming from fixed peers to mobile devices. FIG. 4 shows a simplified topology 400 within which embodiments of the invention may be employed. The topology 400 includes a server 401, as well as multiple fixed peers, 403a-403h, and two distribution trees 405a and 405b, in an example SPPM overlay. The topology 400 also includes a first mobile device 409a and a second mobile device 409b for receiving data from the network of fixed peers 403a-403h.

In the topology 400 illustrated in FIG. 4, the video data 407 generated at the server 401 is distributed to the fixed peers 403a-403h using the distribution trees 405a and 405b of the overlay. The first mobile device 409a and second mobile device 409b can connect to the SPPM network to receive the video data 407 or a subset of that data after transcoding in the SPPM network.

The Stanford Peer-to-Peer Multicast system delivers live video streams to peer nodes 403a-403h over a fixed line network. One source encodes and splits the video data into substreams. Each sub-stream is distributed via its own P2P multicast tree to provide path diversity. Nodes can join (to all trees) and become sharing peers in one or more of the distribution trees 405a and 405b. Error resilience is provided by eth ability to request and retransmit lost packets. Moreover, priority based scheduling of outbound packets may be used to optimize the received video quality. The SPPM infrastructure thus provides high reliability of connections to maintain the overlay network, constant flow of data, and low startup latency.

The SPPM protocol is adapted to organize peers in an overlay of multicast distribution trees 405a and 405b, with every multicast tree being rooted at the video source, e.g., server 401. The source packetizes the video stream and distributes video packets to each multicast distribution tree 405a and 405b in a round robin manner. In an embodiment of the invention, peers 403a-403h subscribe to all multicast distribution trees 405a and 405b in order to receive the video stream contiguously.

Figure 5:
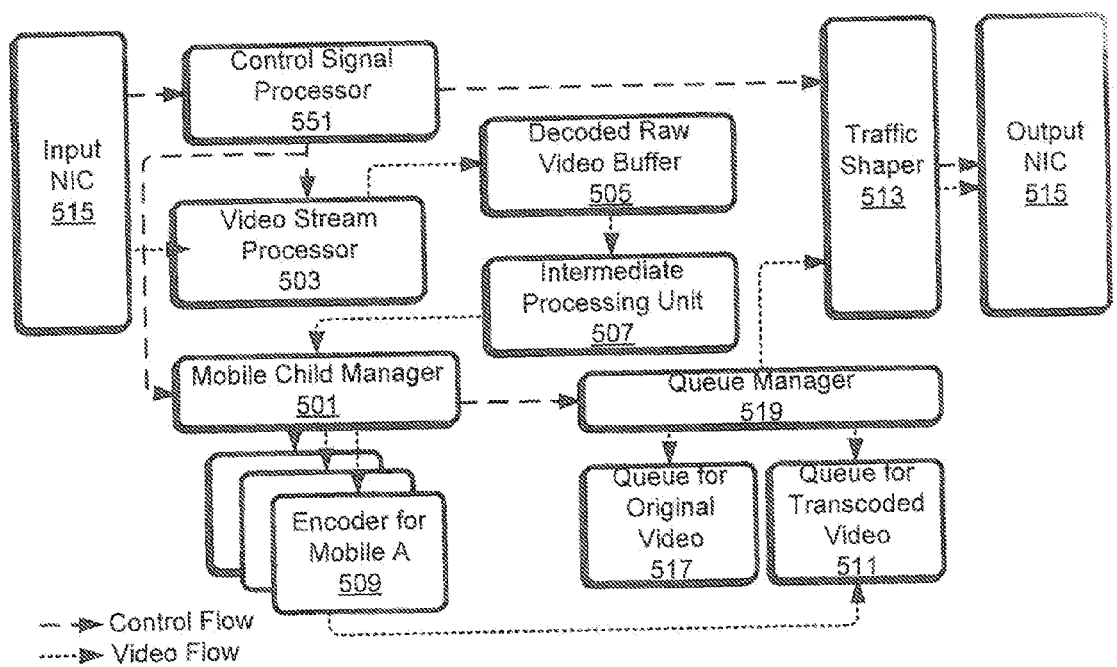
FIG. 5 is a schematic illustration of a Stanford Peer-to-Peer Multicast extension for mobile support of streaming media.

As parents of a mobile client, SPPM peers 103a-103h convert the original video to fit each mobile client's requirements, such as screen size, frame rate, and video quality. As shown in FIG. 5, the SPPM peer configuration is extended to include a mobile child manager 501, a decoder e.g., video stream processor 503, a decoded raw video buffer 505 for buffering the decoded data stream, and an intermediate processing unit 507 for receiving and further processing the raw data.

The intermediate processing unit 507 passes the processed video data to an encoder 509 under control of the mobile child manager 501. The encoder 509 may also include a packetizer, and provides the packetized data to a transcoded video queue 511, as shown in FIG. 5. The mobile child manager 501 creates, maintains, and terminates service to a mobile client. For instance, when a new (mobile) client requests a connection, the mobile child manager 501 creates a dedicated encoder for the client. When a client leaves its parent, whether gracefully or ungracefully, the parent (peer) discards the client information and terminates the encoder that was dedicated to the client.

The video stream processor 503 is used to decompress the original video stream. The decompressed video is stored in the decoded raw video buffer 505 as a form of a raw frame, such as a video signal in the YUV format. Decoding of the original video is performed once the video transmission starts, regardless of the existence of mobile clients. For example, the decompressed video frames may also be used to show the video at the local display. Decompressed frames may be used by more than one encoder, i.e., by multiple mobile clients. Due to packet loss or internal errors in decoding, some raw frames may be missing in the buffer 505. Each frame in the buffer 505 is tagged with both the global Group-Of-Picture (GOP) ID and local Frame-ID (FID). These metadata are piggy-backed in the video packets and referred to by the interleaver at the mobile client, e.g., interleaver 307 to be discussed in greater detail with reference to FIG. 3.

The intermediate processing unit 507 is used for modifying raw frames before they are passed into the encoder 509. Resizing (e.g. down-sampling or changing the ratio of the number horizontal and vertical pixels), cropping, and/or frame rate reduction are performed at this module. For each client, a different intermediate processing may be performed according to the unique requirements of the client, and hence there may be multiple encoders 509. As noted, the encoder 509 encodes the modified raw video signals for each client utilizing a different set of encoding parameters, e.g., GOP (Group of Picture) size, encoding standard (e.g., H.263 or H.264), and total number of parent peers.

The packetizer (not explicitly shown) generates video packets for network transmission, and may also add metadata to packets, e.g., packet ID, GOP ID, substream ID, and a timestamp. The transcoded video queue 511 is used to store video packets. Packets in the transcoded video queue 511 are passed to the NIC 515 (Network Interface Card) by way of the traffic shaper 513 for transmission over the P2P network or directly to the mobile client. This transcoded video queue 511, together with the queue 517 for packets from the original video and control packets, is under the control of traffic shaper 513 and rate controller (queue manager 519) to regulate the out-going traffic.

As can be seen, control data received at the NIC 215 are processed by the Control Signal Processor 221. The processed control signals are used in the processing of the video data and are also utilized to control traffic via the traffic shaper 213.

Figure 6:
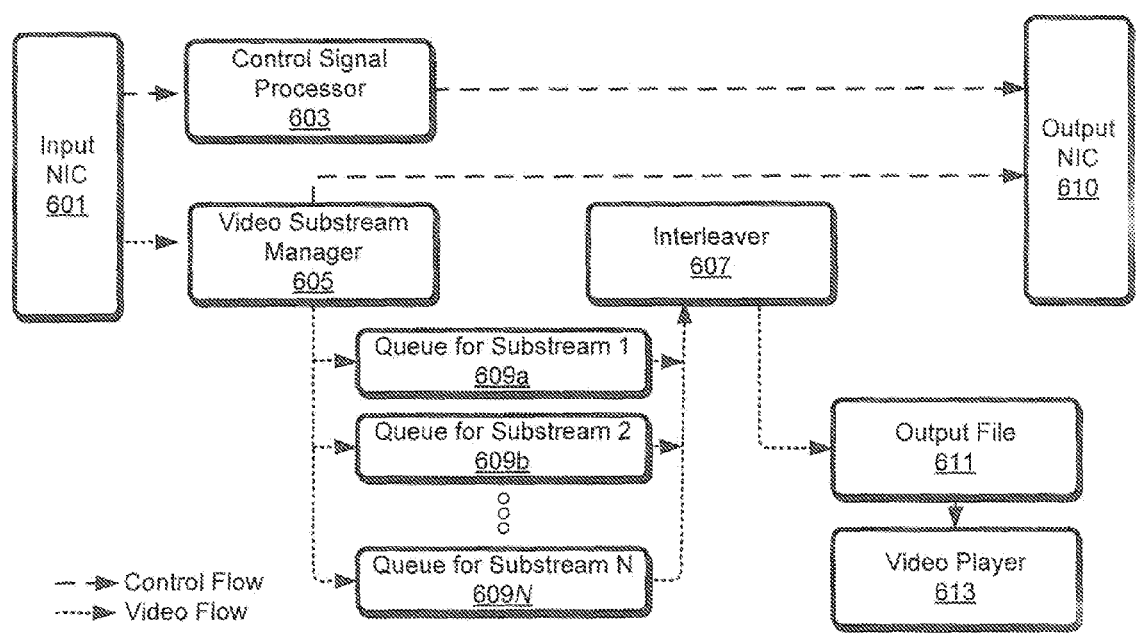
FIG. 6 is a schematic illustration of a Stanford Peer-to-Peer Multicast extension for use on the mobile client for managing parallel transcoding as well as receiving and processing parallel transcoded streaming media.

Referring to FIG. 6, the mobile client consists of the input/output NIC 601/610, a control unit 603, a video substream manager 605, and an inter-leaver 607 as discussed briefly above. The control unit 603 processes incoming control messages and generates response messages or new control messages, e.g., to the client's parents. The video substream manager 605 requests and serially receives and process incoming video packets. In an embodiment of the invention, each substream 609a-609N is a bit stream of an H.264 raw video signal. In particular, the video substream manager 605 divides a substream into frames by detecting the frame boundaries (e.g., NAL units in H.264/AVC). The video substream manager 605 also marks each frame with relevant metadata such as POC (Picture Order Count in a GOP), GOP ID, FID (Frame ID), and the substream ID. For error control, the video substream manager 605 may request retransmission of missing I frames, in addition to detecting parent disconnect and evaluating the download channel status and triggering necessary actions at the control unit 603.

The interleaver 607 assembles the frames of the substreams into a single output bit stream to the output file 611. In the event that there is a missing frame due to a missing packet or missing substream, corresponding copy frame control bits may be substituted for error recovery, i.e., to conceal the missing frames. The interleaver 607 may discard old frames or unnecessary frames in the queues for the substreams 609a-

609N. In an embodiment of the invention, the interleaver 607 begins assembling the output file 611 after a time-out interval. The interval is optionally adjusted so that the initial buffering time and the packet reception ratio (excluding late or missing packets) are balanced.

Returning to the control signal processor 603, this unit processes incoming control messages, and, like the video substream manager 605, may also trigger events, such as coordinating parents, detecting a missing parent, and adapting to the channel status (by temporarily disabling one or more parents).

As noted, the output of the interleaver 607 is the output file 611. In an embodiment, the output of the interleaver 607 may be directly fed into the video player 613 to avoid additional buffering delay between the two units. In this embodiment of the invention the video player 613 plays back the assembled video. Since the video is encoded using the novel distributed transcoding, graceful video degradation is achieved even when there are missing packets or substreams.

Figure 7:
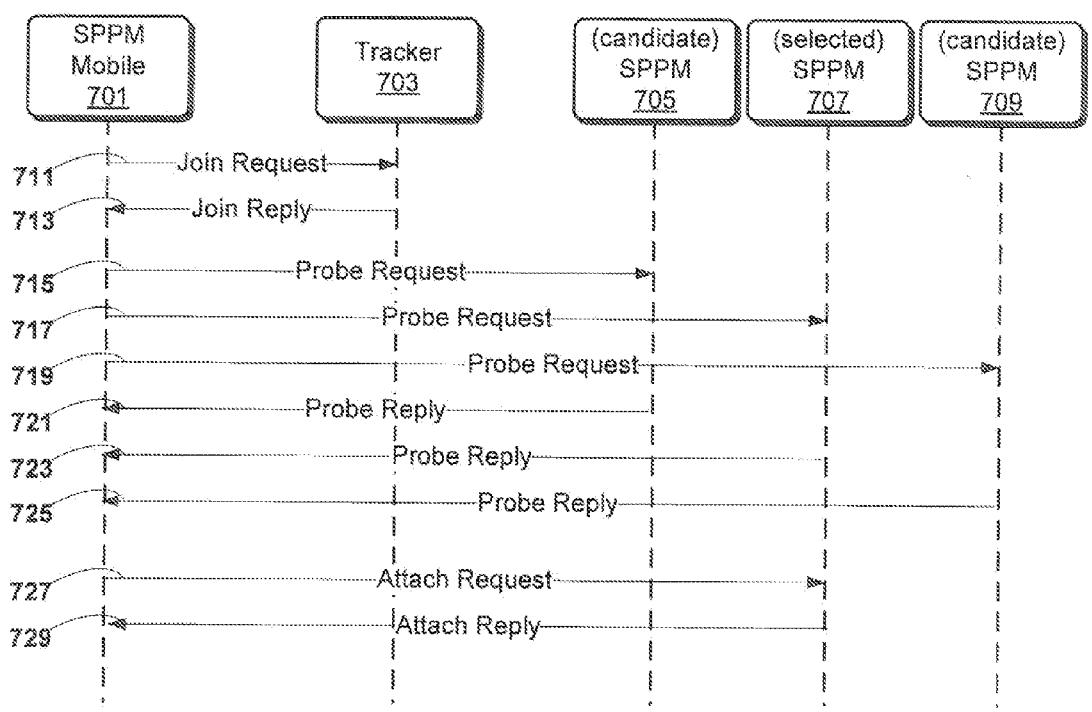
FIG. 7 is a flow diagram illustrating the data and control flow between the mobile client, the tracker, and Stanford Peer-to-Peer Multicast peers in an embodiment of the invention.

FIG. 7 shows example data and control flows between the mobile client 701, the tracker 703, and any SPPM peers 705-709. As will be explained, the mobile client 701 communicates with the tracker 703 and parent candidates 705-709 (among possible SPPM nodes) in order to connect to the SPPM network. Once the mobile client 701 is connected to the network, it may constantly exchange control messages to maintain the parents and to retrieve video packets.

Turning to the specific messaging involved, the client 701 first contacts the tracker 703 (message 711) to ask for a partial list of the active peers in the network. With message 711, the client 701 sends the following information to the tracker 703 in an embodiment of the invention: device class, device capabilities (display size, codecs), and maximum download bitrate. The tracker 703 replies (message 713) with information in reply, such as the bit rate of the original video, a partial list of active peers, etc. The tracker 703 determines the peer list for each mobile receiver in a way that the load of fixed nodes (parents) is well balanced. The mobile client 701 may reinitiate communication to the tracker 703 whenever the current set of peers does not satisfy the client's bandwidth or quality requirements. The tracker 703 may reside at a machine that is also a fixed node, but need not be available for streaming.

Given the list of potential fixed node peers, the client collects information from parent candidates such as the available bandwidth, the depth in the overlay tree of the SPPM network, the frame ID of the recently de-coded frame, etc. This probe is executed via a probe request 715, 717, 719 from the client 701 to the listed peers 705, 707, 709, and resultant respective probe replies 721, 723, 725 from the respective peers.

The client 701 selects several parent candidates to connect to based on the probe replies 721, 723, 725. The criteria for parent selection may be determined by the service provider (e.g., parents physically closest to the mobile client, or parents that are serving the minimum number of mobile clients). Other factors in an embodiment include each candidate's CPU usage (the extent to which the candidate's CPU is idle or busy at a given point), available uplink bandwidth, or roundtrip time (RTT) to the mobile client (which reflects proximity between the candidate and the mobile client in the network). Thus, a parent selection algorithm in this embodiment is to select the parent candidate that has a lowest CPU usage, a sufficient (not necessarily highest) uplink bandwidth, and reports an RTT that is below a certain threshold that a mobile client can tolerate (e.g., 2 second).

In the illustration of FIG. 7, a single selected candidate is shown for clarity. The client 701 connects to selected parent candidate 707 by sending an attach request 727, and by then receiving an affirmative attach reply from the selected candidate 707. In the attach request 727, the client specifies, for example, the following fields: display size, or down-sampling ratio, total number of parents, parent ID (1 to M, M being total number of parents), video quality parameter (quantization parameter used in the encoder), GOP size (interval between I frames, used in the en-coder), synchronization frame ID (The global frame ID, used to assemble substreams at the mobile client), and a request for video transmission (the client requests video from parent peers).

Because there will typically be multiple selected candidates active at any given time during streaming, the mobile client 701 acts as an active coordinator, determining the substream ID for each parent. In this way, in the described embodiment, there is no need for any fixed node parent to coordinate with any other fixed node parent. The client 701 and its parents (e.g., 707) continue to exchange messages for status report or any changes in settings.

Figure 8:
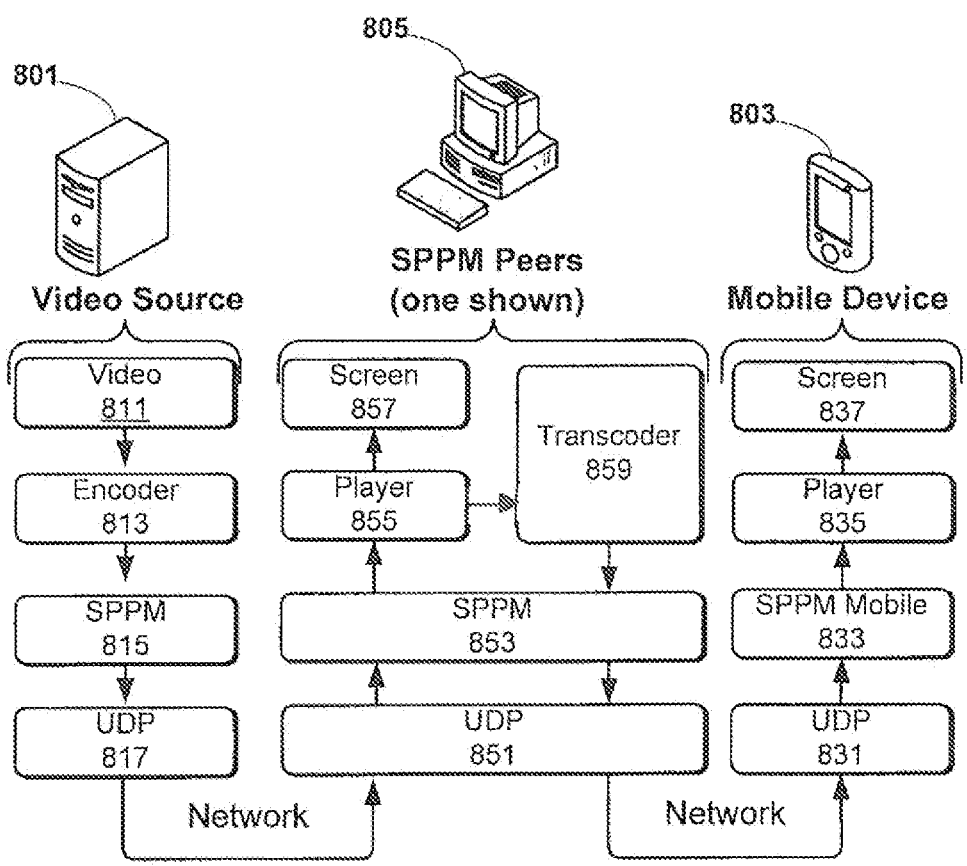
FIG. 8 is a flow diagram illustrating the video bit stream flow from a video source to a mobile client, showing both the horizontal and vertical system structures.

FIG. 8 illustrates the flow of the video bit stream from the video source 801, e.g., server 101, to the mobile client 803, e.g., client 109a, via an exemplary SPPM peer 805. The video source 801 retrieves or obtains video information at point 811, which may be a network interface, internal interface, etc., and encodes the video for transmission at the encoder 813. The encoded video data is then prepared for multicast by the SPPM module 815 and provided to the network by UDP layer 817.

Subsequently, the peer 805 receives the transmitted video data via its UDP layer 851, opens the data from the multicast via the SPPM module 853, and decodes the data at the player 855. The decoded video data may be played to a user of the peer 805 via a local screen 857, but in addition, the data is transcoded by the transcoder 859 in the manner required by the mobile unit 803, after which the transcoded data is packaged for SPPM by the SPPM module 853 and placed on the network via the UDP layer 851.

Upon receiving the video data from the peer 805 via the mobile's UDP layer 831, the mobile unit 803 opens the data via its SPPM module 833, and decodes the data at its player 835. It will be appreciated that the decoding process of player 835 combines the streams received from all transmitting parents. The mobile device then plays the decoded combined video data to the user via a screen 837.

The modules and process discussed herein are generally executed via the computerized reading of computer-executable instructions and data stored on a computer-readable medium such as a ROM, RAM, flash drive, disc drive, optical drive, etc. It will be appreciated however that modules may be implemented via hardware rather than software if so desired.

The invention is especially beneficial for video streaming to mobile users when a large population of fixed-line users (e.g., users associated with personal computers or set-top boxes) watches a live program, such as a soccer match, concert, or political debate. The invention can also be used in fault-tolerant systems, including typical media servers. Servers in a data center, or distributed over physically different regions, can form a peer-to-peer network, serving mobile clients. Mobile clients can connect to multiple servers close to them simultaneously. The invention can also facilitate video-on-demand service. In this case, a peer (or server) possessing the video contents becomes a video source.

All references, including publications, patent applications, and patents, cited herein are hereby incorporated by reference to the same extent as if each reference were individually and specifically indicated to be incorporated by reference and were set forth in its entirety herein. The use of the terms "a"

and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for providing streaming video to mobile clients, the system comprising:
    a video source linked to a plurality of fixed node peers and configured to split streaming video data representing a video presentation into a plurality of substreams, including a first substream and a second substream;
    the plurality of fixed node peers, wherein a fixed node peer of the plurality of fixed node peers comprises a decoder assembly, and is configured to decode one or more of the plurality of substreams for playback on a display of the fixed node peer, and to transcode one or more of the plurality of substreams into a first format for transmission to a first mobile client and into a second format for transmission to a second mobile client; and
    a plurality of mobile clients, including the first mobile client and the second mobile client, each mobile client comprising a video substream manager and interleaver, configured to receive substreams transcoded by the plurality of fixed node peers and to decode one or more of the received substreams for playback on a display of the mobile client;
    wherein the video source and the plurality of fixed node peers are configured to distribute the plurality of substreams to the plurality of mobile clients via a plurality of multicast trees, including distribution of the first substream to the first mobile client via a first multicast tree utilizing a first group of fixed node peers and distribution of the second substream to the first mobile client via a second multicast tree utilizing a second group of fixed node peers different from the first group of fixed node peers;
    wherein each of the plurality of the multicast trees are rooted at the video source.

2. The system of claim 1, wherein the video substream manager and interleaver are configured to produce a reduced quality reconstruction of the video presentation upon occurrence of a condition where the respective mobile device is unable to receive a transcoded substream from at least one fixed node previously connected to the mobile client.

3. The system of claim 2, wherein the reduced quality reconstruction has a lower frame rate than the streaming video presentation.

4. The system of claim 1, wherein the video presentation is associated with a live event.

5. The system of claim 1, wherein the plurality of mobile clients includes a personal digital assistant (PDA).

6. The system of claim 1, wherein the plurality of mobile clients includes a smartphone.

7. The system of claim 1, wherein the plurality of fixed nodes includes one or more personal computers.

8. The system of claim 1, further comprising:
    a tracker external to the plurality of mobile clients and the plurality of fixed nodes, configured to collect information regarding the plurality of fixed nodes and provide the collected information to the plurality of mobile clients.

9. The system of claim 1, wherein the plurality of mobile clients are each configured to request retransmission of missing frames, detect a missing fixed node peer, and evaluate status of one or more download channels.

10. A fixed node peer of a peer to peer network comprising a video source, a plurality of fixed node peers, and a plurality of mobile clients including a first mobile client and a second mobile client, the fixed node peer comprising:
    a network interface for receiving a streaming video presentation from the video source as a plurality of substreams, including a first substream and a second substream;
    a video stream processor linked to the network interface for receiving the plurality of substreams, decoding the plurality of substreams, and playing the streaming video presentation on a display of the fixed node peer; and
    a mobile child manager linked to a plurality of encoders, wherein a first encoder of the plurality of encoders is configured to transcode the decoded streaming video presentation into a first format for the first mobile client, and wherein a second encoder of the plurality of encoders is configured to transcode the decoded streaming video presentation into a second format for the second mobile client;
    wherein the fixed node peer is part of a plurality of multicast trees for distribution of the plurality of substreams from the video source to the plurality of mobile clients, including distribution of the first substream to the first mobile client via a first multicast tree utilizing a first group of fixed node peers and distribution of the second substream to the first mobile client via a second multicast tree utilizing a second group of fixed node peers different from the first group of fixed node peers;
    wherein each of the plurality of the multicast trees are rooted at the video source.

11. The fixed node peer of claim 10, wherein the fixed node peer is a personal computer.

12. The fixed node peer of claim 10, further including a decoded raw video buffer for buffering decoded raw video data prior to use by the mobile child manager.

13. The fixed node peer of claim 10, further comprising a wireless network interface for communication with the one or more mobile clients.

\* \* \* \* \*